(12) United States Patent
Matsubara

(10) Patent No.: US 9,348,206 B2
(45) Date of Patent: May 24, 2016

(54) LIGHT SOURCE APPARATUS AND PROJECTOR HAVING A LIGHT COMBINER WITH A POLARIZATION SEPARATION FILM

(71) Applicant: SEIKO EPSON CORPORATION, Tokyo (JP)

(72) Inventor: Takayuki Matsubara, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 209 days.

(21) Appl. No.: 13/952,161

(22) Filed: Jul. 26, 2013

(65) Prior Publication Data

US 2014/0028981 A1    Jan. 30, 2014

(30) Foreign Application Priority Data

Jul. 30, 2012 (JP) ................................. 2012-168080

(51) Int. Cl.
  *G03B 21/20* (2006.01)
  *F21V 9/14* (2006.01)

(52) U.S. Cl.
  CPC ............. *G03B 21/2073* (2013.01); *F21V 9/14* (2013.01); *G03B 21/204* (2013.01); *G03B 21/2013* (2013.01); *G03B 21/208* (2013.01); *G03B 21/2033* (2013.01)

(58) Field of Classification Search
  CPC ............. G03B 21/204; G03B 21/2073; G03B 21/2033; G03B 21/2013; G03B 21/208
  See application file for complete search history.

(56) References Cited

U.S. PATENT DOCUMENTS

| | | | | |
|---|---|---|---|---|
| 5,453,859 A * | 9/1995 | Sannohe et al. | ................... | 349/9 |
| 5,912,762 A * | 6/1999 | Li | ........................ | G02B 27/283 |
| | | | | 348/E9.027 |
| 5,982,541 A * | 11/1999 | Li et al. | ........................ | 359/242 |
| 6,390,626 B2 * | 5/2002 | Knox | .............................. | 353/20 |
| 6,394,606 B1 * | 5/2002 | Miyawaki et al. | ............... | 353/20 |
| 6,746,122 B2 * | 6/2004 | Knox | .............................. | 353/20 |
| 6,783,241 B2 * | 8/2004 | Miyawaki et al. | ............... | 353/20 |
| 7,926,949 B1 | 4/2011 | Boothroyd | | |
| 8,376,551 B2 * | 2/2013 | Cobb | ............................. | 353/81 |
| 8,388,138 B1 * | 3/2013 | Boothroyd | ............ | G02B 27/26 |
| | | | | 348/51 |
| 8,628,199 B2 * | 1/2014 | Akiyama | ........................ | 353/94 |
| 8,690,343 B2 * | 4/2014 | Tanaka | ............................ | 353/31 |
| 2001/0012092 A1 * | 8/2001 | Knox | .............................. | 353/20 |
| 2002/0122157 A1 * | 9/2002 | Miyawaki et al. | ............... | 353/20 |
| 2002/0159034 A1 * | 10/2002 | Knox | .............................. | 353/20 |
| 2011/0187998 A1 * | 8/2011 | Kimura et al. | ................... | 353/20 |
| 2011/0205501 A1 * | 8/2011 | Cobb | ............................. | 353/81 |
| 2012/0008098 A1 * | 1/2012 | Akiyama | ........................ | 353/30 |
| 2012/0133903 A1 * | 5/2012 | Tanaka | ............................ | 353/31 |
| 2012/0133904 A1 * | 5/2012 | Akiyama | ........................ | 353/38 |

FOREIGN PATENT DOCUMENTS

| | | |
|---|---|---|
| JP | A-2011-158502 | 8/2011 |
| JP | 2012-118110 A | 6/2012 |

* cited by examiner

*Primary Examiner* — Bao-Luan Le
(74) *Attorney, Agent, or Firm* — Oliff PLC

(57) ABSTRACT

A light combiner having a polarization separation film and transmitting P-polarized light from a first light source unit whereas reflecting S-polarized light from a second light source unit forms combined light, and the angle of incidence of the light from the first light source unit and the angle of incidence of the light from the second light source unit with respect to the polarization separation film are each greater than 45°.

16 Claims, 5 Drawing Sheets

LIGHT SOURCE APPARATUS AND PROJECTOR HAVING A LIGHT COMBINER WITH A POLARIZATION SEPARATION FILM

BACKGROUND

1. Technical Field

The present invention relates to a light source apparatus having a plurality of light sources and a projector using the light source apparatus.

2. Related Art

As an illuminator useable, for example, with a projection-type video display apparatus, there is a known illuminator using a plurality of light sources and collecting light fluxes therefrom into a single light flux to efficiently form illumination light without any increase in size of the illuminator (JP-A-2011-158502). In JP-A-2011-158502, a pair of light sources are used and they output light fluxes polarized in different directions and in different degrees. A polarizer that transmits the linearly polarized light from one of the light sources and reflects the linearly polarized light from the other light source collects the light fluxes from the plurality of light sources.

In JP-A-2011-158502, however, for example, depending on the wavelength band of each of the light fluxes emitted from the light sources, the polarizer may not be capable of efficiently combining the polarized light fluxes due, for example, to a narrow polarization separation band corresponding to the area between the wavelength at which P-polarized light is transmitted at a transmittance of 50% and the wavelength at which S-polarized light is transmitted at a transmittance of 50%.

SUMMARY

An advantage of some aspects of the invention is to provide a light source apparatus capable of efficiently combining light fluxes from a light source having polarization dependence and a projector capable of forming high-intensity image light with an increase in size of the light source suppressed using the light source apparatus.

A light source apparatus according to an aspect of the invention includes (a) a first light source unit that emits first light, (b) a second light source unit that emits second light, and (c) a light combiner that combines the first light emitted from the first light source unit and the second light emitted from the second light source unit and outputs the combined light, and (d) the light combiner has a polarization separation film that transmits light polarized in a first direction and reflects light polarized in a second direction perpendicular to the first direction, (e) the first light is polarized in the first direction, (f) the second light is polarized in the second direction, and (g) an angle of incidence $\theta 1$ of the first light with respect to the polarization separation film and an angle of incidence $\theta 2$ of the second light with respect to the polarization separation film are each greater than 45°.

According to the light source apparatus described above, since the angle of incidence $\theta 1$ of the first light and the angle of incidence $\theta 2$ of the second light with respect to the polarization separation film are each greater than 45°, a polarization separation band widens, whereby the first light and the second light are efficiently combined with each other.

In a specific form or specific aspect of the invention, the angle of incidence $\theta 1$ of the first light with respect to the polarization separation film and the angle of incidence $\theta 2$ of the second light with respect to the polarization separation film are equal to each other. In this case, since the optical axis of the first light and the optical axis of the second light are parallel to each other after the light combination, the combined light can be readily used as illumination light.

In another specific aspect of the invention, an optical axis of the first light source unit and an optical axis of the second light source unit form an angle smaller than 90°. In this case, $\theta 1$ and $\theta 2$ can both be greater than 45°.

In still another specific aspect of the invention, in a wavelength band of the first light, the angle of incidence $\theta 1$ of the first light is so set that the polarization separation film transmits the first light at a transmittance of a predetermined value or greater and the light combiner reflects the first light at a reflectance of a predetermined value or smaller, and in a wavelength band of the second light, the angle of incidence $\theta 2$ of the second light is so set that the polarization separation film reflects the second light at a reflectance of a predetermined value or greater. In this case, the amount of decrease in light usage efficiency that occurs when the polarization separation film cannot handle part of the wavelength band of the first light or part of the wavelength band of the second light can be reduced, and the amount of decrease in light usage efficiency due to reflection of the transmitted light can be reduced.

In yet another specific aspect of the invention, the following expressions (1), (2), and (3) are satisfied.

$$45° < \alpha \tag{1}$$

$$\beta \leq \theta 1 \leq 2\alpha - \beta \tag{2}$$

$$\beta \leq \theta 2 \leq 2\alpha - \beta \tag{3}$$

In the expressions, $\alpha$ represents a maximum efficiency angle that is an angle of incidence with respect to the polarization separation film where polarized light combination efficiency is maximized, the maximum efficiency angle $\alpha$ determined in accordance with a wavelength band of the first light and a wavelength band of the second light, and $\beta$ is $(45° + \alpha)/2$. In this case, higher light usage efficiency is provided than in a case where $\theta 1$ and $\theta 2$ are each 45°.

In still yet another aspect of the invention, the light combiner further includes a base that supports the polarization separation film, and the angle of incidence $\theta 1$ of the first light falls within a range including Brewster's angle with respect to the base. In this case, the transmittance representing how much the first light is transmitted can be increased by setting the angle of incidence $\theta 1$ to be equal to Brewster's angle or an angle close thereto.

In further another specific aspect of the invention, the light source apparatus further includes a collector system that collects the combined light outputted from the light combiner and an object to be irradiated with the combined light collected by the collector system. In this case, the object can be efficiently irradiated with the combined light.

In still further another specific aspect of the invention, the light source further includes an afocal system that adjusts a beam cross section of the combined light outputted from the light combiner, a lens array integrator that is disposed in a position downstream of the afocal system, divides light incident on the lens array integrator, and outputs the divided light fluxes in such a way that the light fluxes are superimposed in a predetermined position, and an object that is disposed in the predetermined position and irradiated with the light outputted from the lens array integrator. In this case, the object can be efficiently irradiated with the combined light in a highly uniform manner.

In yet another specific aspect of the invention, the object is at least one of a diffuser plate that diffuses light and a fluorescent material that produces fluorescence. In this case, divergent light or light having an appropriate wavelength band can be produced as required.

In still yet further another aspect of the invention, the light source apparatus further includes a rotating plate that rotatably holds the object. In this case, no portion having an abruptly high optical intensity will be produced, or no decrease in light emission efficiency due to a high output from any of the excitation light source units will occur, whereby bright illumination is achieved.

A projector according to another aspect of the invention includes any of the light source apparatus described above, a light modulator that modulates the light from the light source apparatus in accordance with image information, and a projection system that projects the modulated light from the light modulator to form an image. In this case, using the light source apparatus described above allows high-intensity light to be formed with an increase in size of each of the light source units suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A light source apparatus according to a first embodiment of the invention will be described below in detail with reference to the drawings.

Figures 1A, 1B:
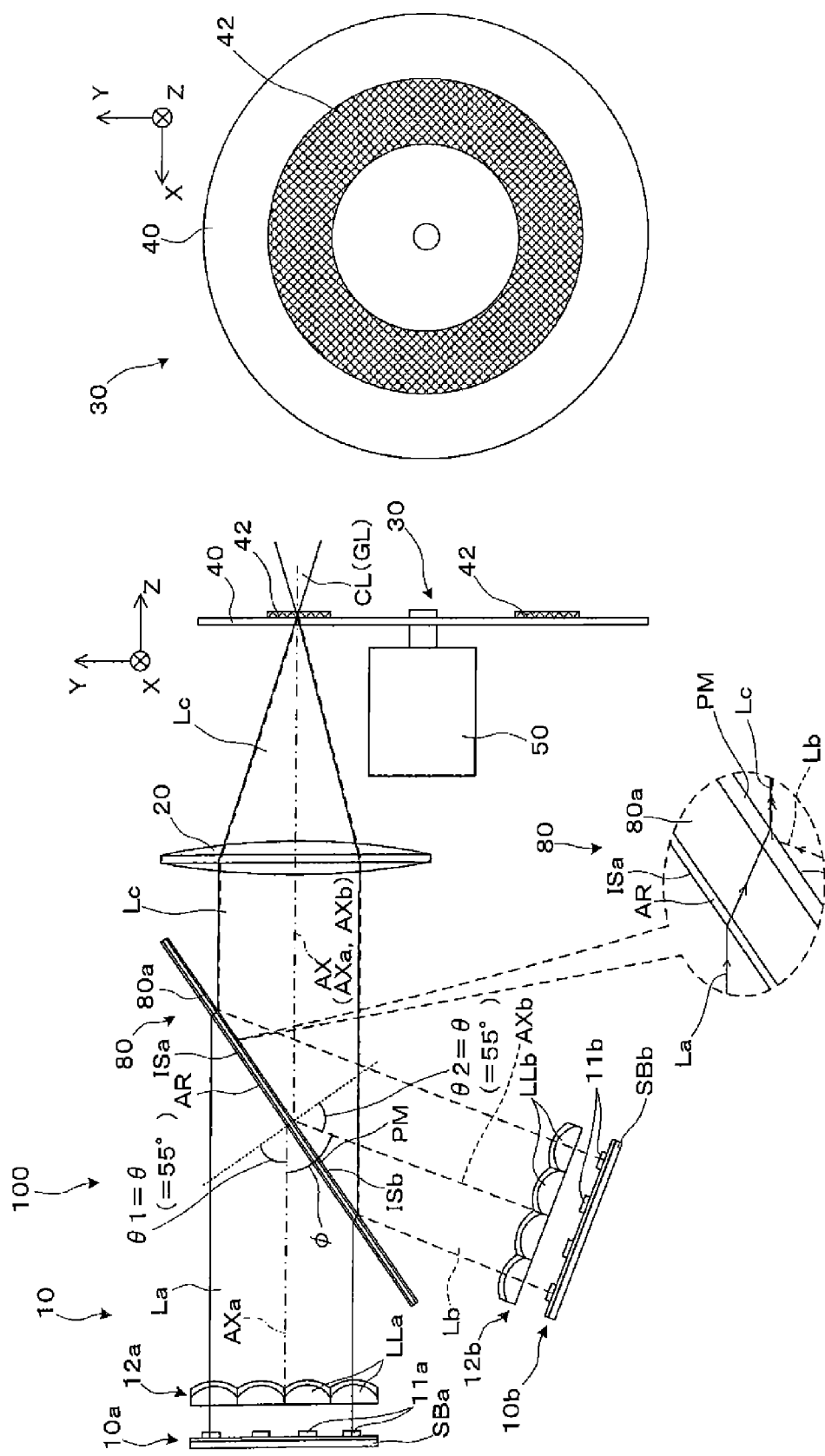
FIG. 1A describes the optical system of a light source apparatus according to a first embodiment, and FIG. 1B describes a rotating fluorescent plate.

A light source apparatus 100 shown in FIG. 1A includes a light combiner 80, which combines laser light La, which is first light, emitted from a first light source unit 10a, and laser light Lb, which is second light, emitted from a second light source unit 10b to form light that will serve as light source light. The light source apparatus 100 includes an excitation light source 10, the light combiner 80, which combines light fluxes from the light source 10, a collector lens 20, which is a collector system, a rotating fluorescent plate 30, which is a rotating plate that rotatably holds a wavelength conversion element, and a motor 50. The light source 10 includes the first light source unit 10a, the second light source unit 10b, a collimation lens array 12a, which parallelizes light from the first light source unit 10a, and a collimation lens array 12b, which parallelizes light from the second light source unit 10b. The rotating fluorescent plate 30 has a circular-plate-like shape, as shown in FIG. 1B.

In the light source 10, the first light source unit 10a is a laser light source that emits blue laser light La, which is the first light. Reference character AXa denotes the optical axis of the first light source unit 10a. The laser light La is linearly polarized light, has a light emission intensity peak at a wavelength of about 445 nm, and primarily contains light components that belong to a wavelength band ranging from 430 to 450 nm. The first light source unit 10a is formed of a plurality of solid-state light source devices 11a, each of which is capable of emitting laser light, mounted on a substrate SBa and arranged in a matrix.

In the light source 10, the second light source unit 10b is a laser light source that emits blue laser light Lb, which is the second light. Reference character AXb denotes the optical axis of the second light source unit 10b. The laser light Lb is linearly polarized light, has a light emission intensity peak at a wavelength of about 445 nm, and primarily contains light components that belong to a wavelength band ranging from 430 to 450 nm. The second light source unit 10b is formed of a plurality of solid-state light source devices 11b, each of which is capable of emitting laser light, mounted on a substrate SBb and arranged in a matrix.

The collimation lens array 12a, which is formed of a plurality of lens groups LLa corresponding to the solid-state light source devices 11a, which form the first light source unit 10a, substantially parallelizes the light from each of the solid-state light source devices 11a and directs the resultant light toward the light combiner 80.

Similarly, the collimation lens array 12b, which is formed of a plurality of lens groups LLb corresponding to the solid-state light source devices 11b, which form the second light source unit 10b, substantially parallelizes the light from each of the solid-state light source devices 11b and directs the resultant light toward the light combiner 80.

An antireflection film AR is provided on one surface of a base 80a of the light combiner 80, and a polarization separation film PM is provided on the other surface of the base 80a of the light combiner 80, as shown in a partial enlarged view of FIG. 1B. The one surface, on which the antireflection film AR is provided, is a light incident surface ISa, on which the laser light La from the first light source unit 10a is incident. The other surface, on which the polarization separation film PM is provided, is a light reflecting surface ISb, on which the laser light Lb from the second light source unit 10b is incident. The base 80a is made, for example, of white glass (white plate). The polarization separation film PM is a dielectric multilayer film and handles the light incident on the light combiner 80 in such a way that P-polarized light is transmitted and S-polarized light is reflected.

The light combiner 80 is disposed in a position in the optical path between the light source 10 and the collector lens 20, as shown in the overall view of FIG. 1A. Now, let $\theta 1$ be the angle of incident of the laser light La, which is the first light, with respect to the polarization separation film PM, and let $\theta 2$ be the angle of incidence of the laser light Lb, which is the second light, with respect to the polarization separation film PM. The angles of incidence $\theta 1$ and $\theta 2$ are equal to each other. Now, $\theta 1$ and $\theta 2$ are assumed to be $\theta$. The light combiner 80 is so disposed that the intersection angle between the normal of the light combiner 80 and the optical axes AXa, AXb is 55°, which is greater than 45°. That is, in the present embodiment, $\theta = 55°$. The light combiner 80 transmits the laser light La from the first light source unit 10a, whereas reflecting the laser light Lb from the second light source unit 10b to combine the laser light La and the laser light Lb with each other and outputs combined laser light Lc, which is the resultant combined light, as shown in the partial enlarged view. Further, since the angle of incidence $\theta 1$ of the laser light La and the angle of incidence $\theta 2$ of the laser light Lb are equal to each other and are each $\theta$, the optical axis AXa of the laser light La and the optical axis AXb of the laser light Lb become parallel to each other after the light combination. In the configuration in the present embodiment, the optical axis AXa of the laser light La and the optical axis AXb of the laser light Lb coincide with each other after the light combination, and the optical axis of the combined laser light Lc, which is the resultant combined light, is called AX.

From another viewpoint of the arrangement of the light combiner 80 relative to the first light source unit 10a and the second light source unit 10b described above, setting an angle φ between the optical axis AXa of the first light source unit 10a and the optical axis AXb of the second light source unit 10b to be smaller than 90° makes the angle θ, which is the angle of incidence of each of the laser light La and the laser light Lb with respect to the polarization separation film PM, greater than 45°.

It is now assumed that the laser light La, which is the light from the first light source unit 10a and linearly polarized, and the laser light Lb, which is the light from the second light source unit 10b and linearly polarized, are incident on the light combiner 80 so that the polarization directions of the two types of laser light are perpendicular to each other. Specifically, the laser light La is P-polarized light (light polarized in first direction) with respect to the light incident surface ISa of the light combiner 80, whereas the laser light Lb is S-polarized light (light polarized in second direction) with respect to the light reflecting surface ISb of the light combiner 80. The laser light La, which is P-polarized light, is incident on the light incident surface ISa of the light combiner 80, travels through the antireflection film AR, the base 80a, and the polarization separation film PM, and exits through the light reflecting surface ISb of the light combiner 80. On the other hand, the laser light Lb, which is S-polarized light, is incident on the light reflecting surface ISb of the light combiner 80, travels through the polarization separation film PM, and exits through the light reflecting surface ISb. The thus configured light combiner 80 outputs the combined laser light Lc, which is the combination of the P-polarized laser light La and the S-polarized laser light Lb, through the light reflecting surface ISb.

The collector lens 20, which is disposed in the optical path in a position downstream of the light combiner 80, substantially collects the combined laser light Lc having exited out of the light combiner 80 and causes the resultant light to be incident on a fluorescent material 42, which is an object to be irradiated.

The rotating fluorescent plate 30 is what is called a transmissive rotating fluorescent plate. The rotating fluorescent plate 30 is formed of a plate 40 rotatable by the motor 50 and the fluorescent material 42 formed on the plate 40 continuously along the direction in which the plate 40 rotates, as shown in FIGS. 1A and 1B. The area where the fluorescent material 42 is formed includes an area on which the combined laser light Lc, which is excitation light (blue light), is incident. The rotating fluorescent plate 30 outputs mixed light CL containing red light and green light toward the side facing away from the side where the combined laser light Lc is incident.

The rotating fluorescent plate 30 in operation rotates at 7500 rpm. The fluorescent material 42, which has an annular shape and is concentric with the rotating fluorescent plate 30, is disposed on one surface of the rotating fluorescent plate 30. Although not described in detail, the rotating fluorescent plate 30 has a diameter of, for example, about 50 mm and is so configured that the optical axis of the excitation light incident on the rotating fluorescent plate 30 passes through the fluorescent material 42 in a position set apart from the center of rotation of the rotating fluorescent plate 30 by about 22.5 mm. That is, the rotating fluorescent plate 30 rotates at a speed of rotation that allows a focused spot of the excitation light to move along the fluorescent material 42 at about 18 m/sec.

The fluorescent material 42 converts, for example, part of the combined laser light Lc (blue light) as the excitation light outputted from the light source 10 into light containing red light and green light. That is, the fluorescent material 42 is a wavelength conversion element that converts the combined laser light Lc into light containing components that belong to another wavelength range. Specifically, the fluorescent material 42 is efficiently excited by the excitation light having a wavelength of 445 nm, converts part of the excitation light outputted from the light source 10 into yellow fluorescence containing red light and green light, and outputs the yellow fluorescence. The components of the yellow fluorescence are used as follows: Components on the longer wavelength side are used as red light; and components on the shorter wavelength side are used as green light. Further, components of the combined laser light Lc that are not converted by the fluorescent material 42 are used as blue light. That is, the mixed light CL is a mixture of three color components including not only red and green components but also a blue component.

The fluorescent material 42 is formed of a layer containing $(Y,Gd)_3(Al,Ga)_5O_{12}$:Ce which is a YAG-based fluorescent material. The fluorescent material 42 may alternatively be formed of a layer containing a mixture of a fluorescent material that converts the excitation light (blue light) into red light and a fluorescent material that converts the excitation light (blue light) into green light.

The plate 40, which supports the fluorescent material 42, is made of a transparent material that transmits the excitation light, such as crystal glass, quartz, sapphire, optical glass, and transparent resin. A dichroic film formed, for example, of a dielectric multilayer film may further be provided between the fluorescent material 42 and the plate 40 so that components of the light emitted from the fluorescent material 42 that return toward the plate 40 are reflected for improvement in light usage efficiency.

The thus configured light source apparatus forms the mixed light CL as light source light GL. It is noted that a collimation system that prevents the mixed light CL having exited out of the fluorescent material 42 on the rotating fluorescent plate 30 from diverging but substantially parallelizes the mixed light CL may further be provided and the light parallelized by the collimation system may be outputted as the light source light GL.

In the present specification, a wavelength range within which the polarization separation film PM efficiently transmits P-polarized light and efficiently reflects S-polarized light is called a polarization separation band. The polarization separation band depends, for example, on the film design of the polarization separation film PM and the angle of incidence of light incident on the polarization separation film PM. The polarization separation band widens with the angle of incidence irrespective of the wavelength band of the incident light or irrespective of the type of film design. In the present embodiment, the light combiner 80 is configured to have a wide polarization separation band by setting the angle of incidence θ of the laser light La and the laser light Lb to be greater when the wavelength bands of the laser light La and the laser light Lb are wider. It is, however, noted that as a prerequisite for the increase in the angle of incidence, it is also important not to greatly increase loss of the laser light La, which is incident on the light incident surface ISa.

Figure 2:
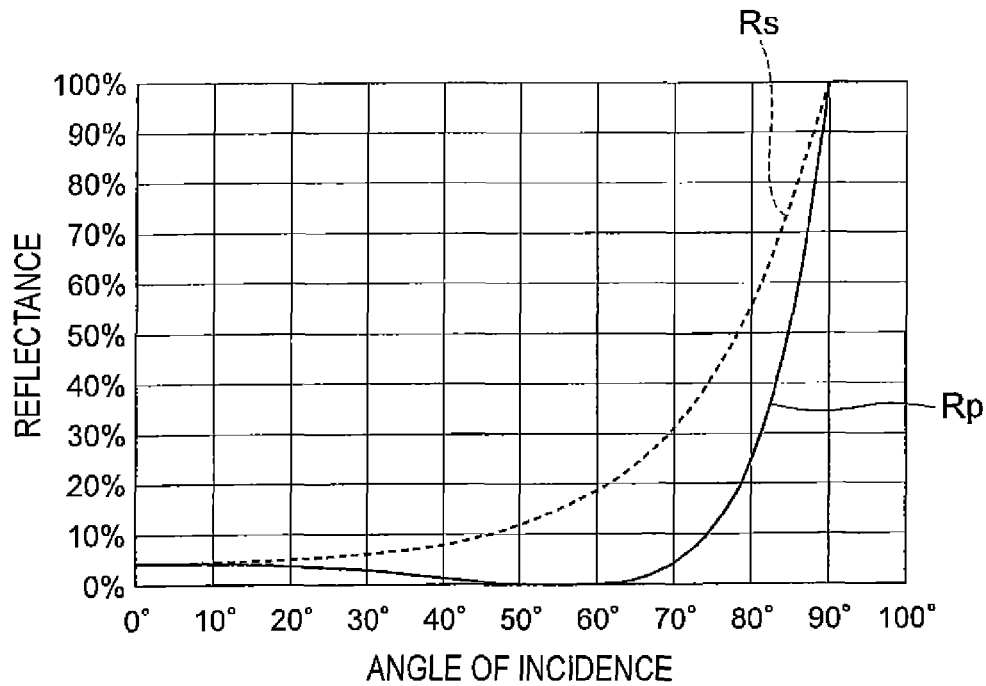
FIG. 2 shows graphs illustrating surface reflectance of a base of a light combiner versus the angle of incidence of polarized light.

FIG. 2 shows graphs illustrating polarized light surface reflectance of white glass (refractive index n=1.52) by way of example. In FIG. 2, the horizontal axis represents the angle of incidence, and the vertical axis represents the reflectance. In the present embodiment, white glass is used as the material of the base 80a of the light combiner 80. In FIG. 2, the solid curve Rp represents reflectance representing how much P-polarized light is reflected, and the broken line Rs represents reflectance representing how much S-polarized light is reflected. A challenge in the present embodiment is the reflectance representing how much the base 80a reflects the laser light La, which is P-polarized light and should pass through the base 80a. Since Brewster's angle is about 55° as shown in FIG. 2, the light combiner 80 can be configured to allow the laser light La, which is P-polarized light, to be incident at or substantially at Brewster's angle so that the combiner 80 efficiently transmits the laser light La, whereby the transmittance representing how much the base 80a transmits the laser light La can be increased. When the transmittance representing how much the base 80a transmits the laser light La is sufficiently high as described above in preparation for the incidence of the laser light La on the polarization separation film PM, the antireflection film AR on the light combiner 80 can be omitted or the antireflection film AR can be formed of a monolayer film, which can be readily formed.

Figure 3:
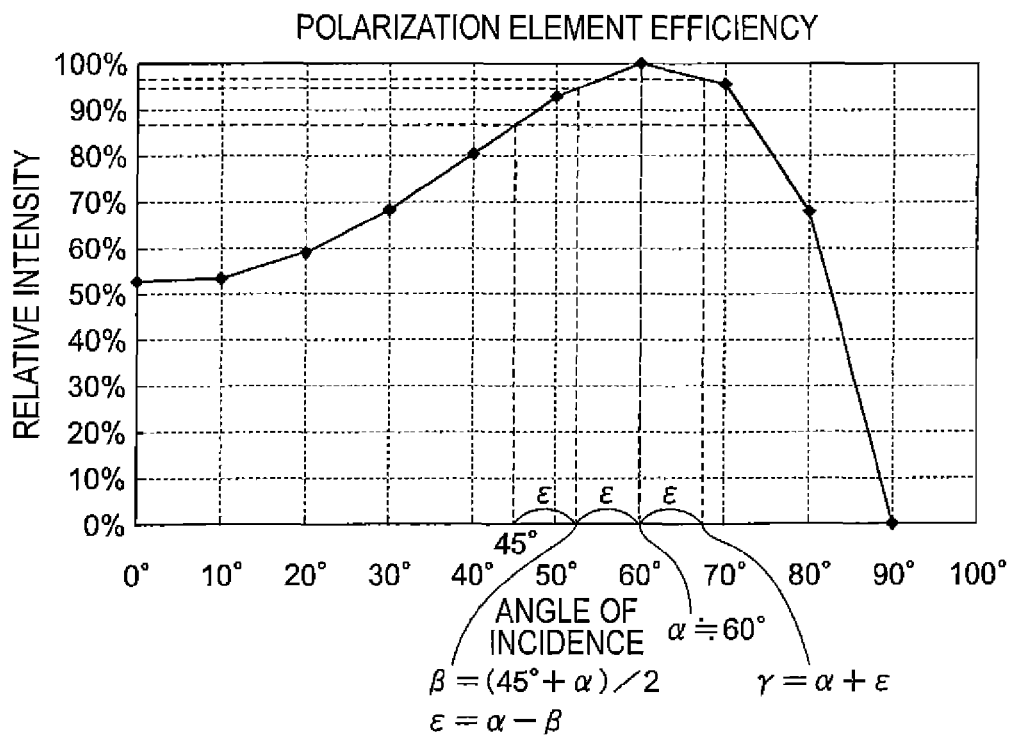
FIG. 3 shows a graph illustrating an example of light usage efficiency of the light combiner versus the angle of incidence.

FIG. 3 shows a graph illustrating an example of light usage efficiency versus the angle of incidence of the light incident on the light combiner 80. Specifically, in the example shown in FIG. 3, the polarization separation film PM of the light combiner 80 has a structure in which a single layer formed of a film H made of $Nb_2O_5$ is provided as a substrate and a stacked member formed of a set of a film L made of $SiO_2$ and a film H made of $Nb_2O_5$ is stacked on the substrate film H nine times. It is assumed that the wavelength band of each of the laser light La and the laser light Lb is 450±15 nm. The graph in FIG. 3 shows the light usage efficiency after the light combination versus the angle of incidence $\theta$. That is, in FIG. 3, the horizontal axis represents the angle of incidence $\theta$, and the vertical axis represents the light usage efficiency as a function of the angle of incidence $\theta$. In this case, it is shown that the efficiency is maximized when the angle of incidence $\theta$ is about 60°. That is, when the laser light La, which is the first light, is caused to be incident on the light combiner 80 at an angle of incidence greater than 45°, more preferably about 60° so that the laser light La passes through the light combiner 80, and the laser light Lb, which is the second light, is caused to be incident on the light combiner 80 at an angle of incidence greater than 45°, more preferably about 60° so that the laser light Lb is reflected off the light combiner 80, the light combination can be efficiently performed. High-intensity light can therefore be formed with an increase in size of the light source suppressed. That is, the transmittance representing how much P-polarized light is transmitted and the reflectance representing how much S-polarized light is reflected can be increased by setting the angle of incidence $\theta$ of the incident light to be greater than 45° and to be close to 60°, where the efficiency is maximized. Further, the setting described above can increase the transmittance for P-polarized light and the reflectance for S-polarized light in a wider wavelength band, whereby the light usage efficiency as a whole after the light combination can be increased. On the other hand, when the angle of incidence $\theta$ is set to be greater than 60°, the reflectance representing how much P-polarized light, that is, the laser light La, which is the first light, is reflected off the light incident surface ISa of the light combiner 80 increases in accordance with the relationship between the reflectance and Brewster's angle, and the amount of components of the laser light La that do not pass through the light combiner 80 increases accordingly. That is, loss of the laser light La due to the reflection increases. The light usage efficiency as a whole after the light combination therefore decreases. In the description, the angle of incidence $\theta$ where the light usage efficiency is maximized (about 60° in the present embodiment) is called a maximum efficiency angle and represented by an angle $\alpha$ as shown in FIG. 3. As described above, the light usage efficiency can be particularly increased, for example, by setting the angle of incidence $\theta$ of the laser light La and the laser light Lb to fall within a range greater than or equal to Brewster's angle but smaller than or equal to the maximum efficiency angle $\alpha$.

The angle of incidence $\theta$ may alternatively be set as follows: For example, the angle of incidence $\theta$ is preferably greater than or equal to $\beta$ but smaller than or equal to $\gamma$, where $\beta=(45°+\alpha)/2 (>45°)$, $\in=\alpha-\beta$, and $\gamma=\alpha+\in (=2\alpha-\beta)$. Setting the angle of incidence $\theta 1$ of the laser light La and the angle of incidence $\theta 2$ of the laser light Lb as described above provides a much higher light usage efficiency than a case where the angle of incidence $\theta 1$ of the laser light La and the angle of incidence $\theta 2$ of the laser light Lb are each 45° as in related art. In the case shown in FIG. 3, for example, when the angle of incidence is 45°, the efficiency decreases by at least 10% from the efficiency provided at the maximum efficiency angle $\alpha$, whereas when the angle of incidence falls with in the range described above, the decrease in the efficiency can be smaller than 10% from the efficiency provided at the maximum efficiency angle $\alpha$, whereby relatively high efficiency is provided.

Still alternatively, the angle of incidence $\theta$ may be set as follows: For example, let $\theta a$ be the lower limit of a range of the angle of incidence $\theta$ within which the transmittance representing how much P-polarized light is transmitted is maintained at a desired value or greater and the reflectance representing how much S-polarized light is reflected is maintained at a desired value or greater. $\theta a$ is greater than 45°. Further, let $\theta b$ be the upper limit of a range of the angle of incidence $\theta$, with reference to Brewster's angle, within which loss of the transmitted light (first light) due to the reflection is maintained at a desired value or smaller. $\theta b$ is greater than Brewster's angle. The angle of incidence $\theta$ may then be set at a value greater than or equal to $\theta a$ but smaller than or equal to $\theta b$. Setting the angle of incidence $\theta 1$ of the laser light La and the angle of incidence $\theta 2$ of the laser light Lb as described above prevents part of the wavelength bands of the first light and the second light from falling outside the polarization separation band, thereby preventing the light usage efficiency from decreasing. As described above, the angle of incidence may also be so set to prevent the light usage efficiency from decreasing due to the reflection of the laser light La, which should pass through the light combiner 80.

Second Embodiment

A light source apparatus according to a second embodiment will be described below. The light source apparatus according to the present embodiment is a variation of the light source apparatus 100 according to the first embodiment and differs therefrom only in terms of the structure downstream of the light combiner 80, and no overall description will therefore be made.

Figure 4:
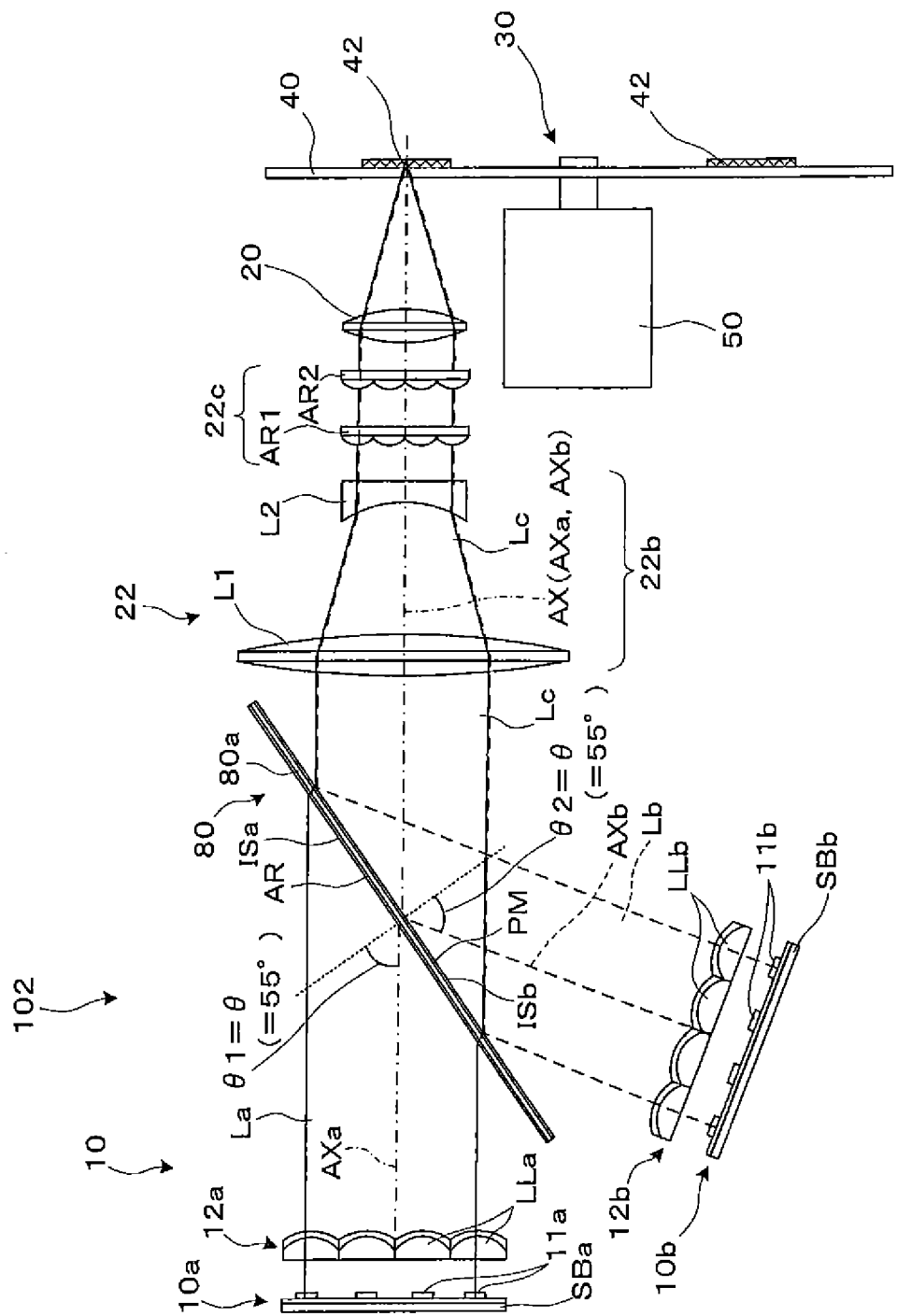
FIG. 4 describes the optical system of a light source apparatus according to a second embodiment.

A light source apparatus 102 according to the present embodiment includes the light source 10, the light combiner 80, a Koehler illumination system 22, which makes the intensity distribution of the light from the light combiner 80 uniform, the collector lens 20, the rotating fluorescent plate 30, and the motor 50, as shown in FIG. 4. The light source 10 includes the first light source unit 10a and the second light source unit 10b. The Koehler illumination system 22, which includes an afocal system 22b, which adjusts the beam cross section of light, and a lens array integrator 22c, which divides light incident thereon, uniformly illuminates the fluorescent material 42 in the form of Koehler illumination. In this regard, the light source apparatus 102 differs from the light source apparatus 100 according to the first embodiment, which performs critical illumination.

The afocal system 22b of the Koehler illumination system 22 is formed of a lens group that is a combination of a positive lens L1 and a negative lens L2. The afocal system 22b adjusts the size of the beam cross section, that is, the light flux cross section of parallelized incident light while maintaining the parallelism thereof. Excitation light having a beam cross section adjusted by the afocal system 22b is incident on the lens array integrator 22c. In the description, the adjustment is so made that the light flux cross sectional area decreases.

The lens array integrator 22c is formed of a pair of lens arrays AR1 and AR2. The lens array integrator 22c divides the light incident from the afocal system 22b and superimposes the divided light fluxes on the fluorescent material 42, which is a surface to be irradiated to make the intensity distribution of the light uniform while maintaining a certain degree of divergence of the light.

As described above, the afocal system 22b and the lens array integrator 22c function as a light adjustment system that adjusts the combined laser light Lc, which is combined light from the light combiner 80, to achieve Koehler illumination.

In the configuration described above, the laser light La from the first light source unit 10a and the laser light Lb from the second light source unit 10b are substantially parallelized by the collimation lens array 12a and the collimation lens array 12b respectively and combined with each other by the light combiner 80. The combined laser light Lc formed by the light combination is made uniform by the Koehler illumination system 22 and outputted.

In the present embodiment, since the combined laser light Lc (excitation light) having traveled along the light source 10, the light combiner 80, and the Koehler illumination system 22 and hence having a uniform intensity distribution passes through the collector lens 20 and impinges on the fluorescent material 42 on the rotating fluorescent plate 30, the fluorescent material 42 will not locally irradiated with excessively intense excitation light. No decrease in light emission efficiency of the fluorescent material 42 or no degradation of the fluorescent material 42 will therefore occur.

In the present embodiment, causing the laser light La, which is the first light, to be incident on the light combiner 80 at an angle greater than 45° and pass through the light combiner 80 and the laser light Lb, which is the second light, to be incident on the light combiner 80 at an angle greater than 45° and reflected off the light combiner 80 also allows the light combination to be efficiently performed, whereby high-intensity light can be formed with an increase in size of the light source suppressed.

Third Embodiment

Figure 5:
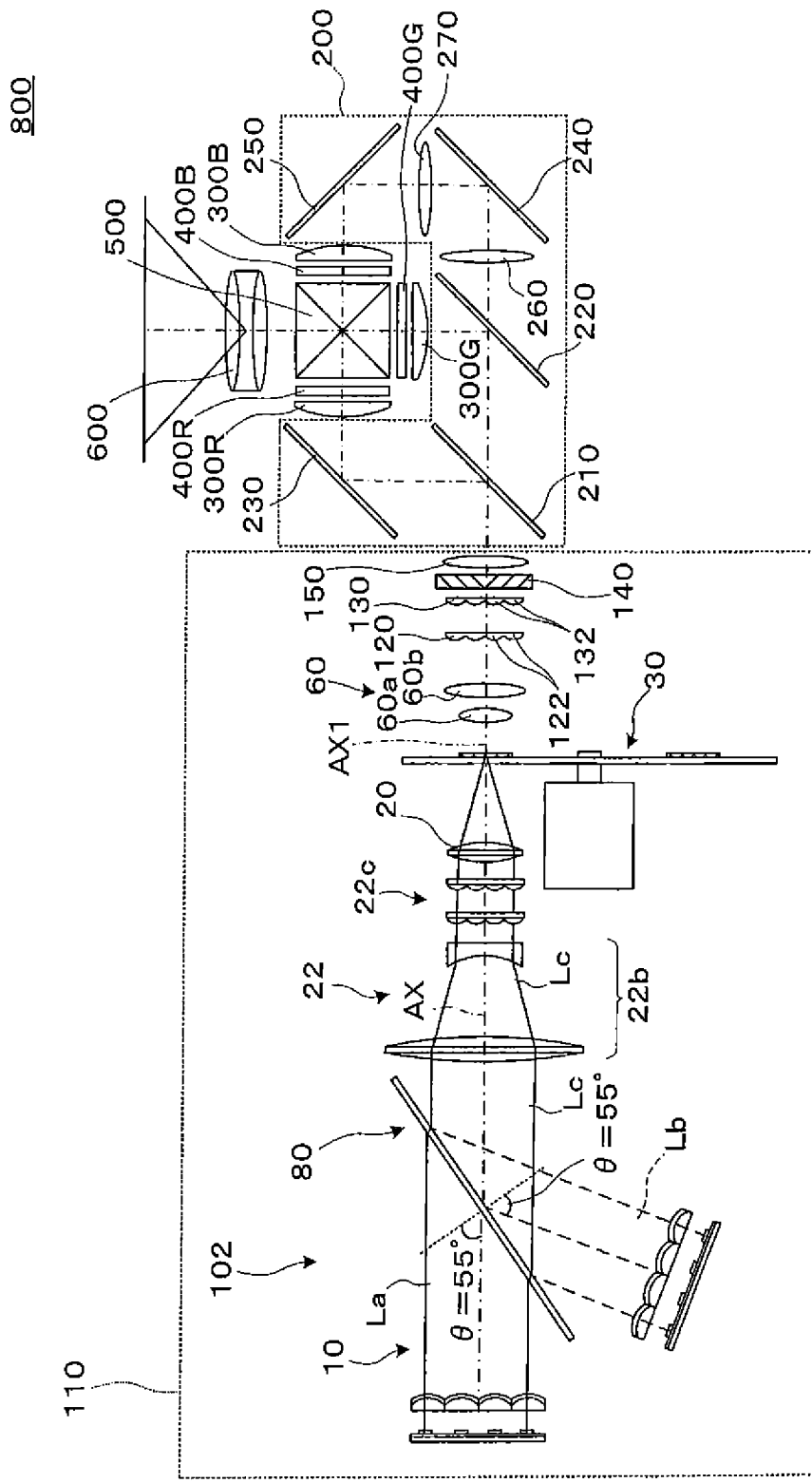
FIG. 5 describes an example of a projector according to a third embodiment.

A projector including a light source apparatus will be described below as a third embodiment. FIG. 5 shows an example of a projector including the light source apparatus described above. FIG. 5 shows a projector 800 using the light source apparatus 102 shown in FIG. 4 by way of example, but the light source apparatus 102 can be replaced with the light source apparatus 100 shown in FIGS. 1A and 1B.

The projector 800 shown in FIG. 5 includes, as an apparatus that forms illumination light, an illuminator 110 including the light source apparatus 102. The illuminator 110 includes a pickup lens group 60 formed of a pickup lens 60a and a pickup lens 60b, a first lens array 120, a second lens array 130, a polarization conversion element 140, and a superimposing lens 150 as well as the light source apparatus 102 described above. The projector 800 further includes a color separation/light guiding system 200, a liquid crystal light modulator 400R, a liquid crystal light modulator 400G, and a liquid crystal light modulator 400B, as light modulators, a cross dichroic prism 500, and a projection system 600. Further, a collector lens 300R, a collector lens 300G, and a collector lens 300B are disposed between the color separation/light guiding system 200 and the liquid crystal light modulator 400R, the liquid crystal light modulator 400G, the liquid crystal light modulator 400B, respectively.

The illuminator 110 uses the light source light outputted from the light source apparatus 102 to form illumination light for illuminating the light modulator 400R, the light modulator 400G, and the light modulator 400B described above.

The pickup lens group 60, which is formed of the pickup lens 60a and the pickup lens 60b, functions as a collimation system that substantially parallelizes the diverging light source light GL outputted from the light source apparatus 102.

The first lens array 120 has a plurality of first lenslets 122 for dividing the light from the light source apparatus 102 into a plurality of sub-light fluxes. The first lens array 120 functions as a light flux dividing optical element that divides the light having passed through the pickup lens group 60 into a plurality of sub-light fluxes. The first lens array 120 has a configuration in which the plurality of first lenslets 122 are arranged in a matrix in a plane perpendicular to an illumination optical axis AX1 of the illuminator 110, which is an extension of the optical axis AX of the light source apparatus 102. Although not described with reference to FIG. 5, the outer shape of each of the first lenslets 122 is substantially similar to the outer shape of an image formation area of each of the liquid crystal light modulators 400R, 400G, and 400B.

The second lens array 130 has a plurality of second lenslets 132 corresponding to the plurality of first lenslets 122 in the first lens array 120. The second lens array 130 in conjunction with the superimposing lens 150 has a function of focusing images of the first lenslets 122 in the first lens array 120 in the vicinity of the image formation area of each of the liquid crystal light modulators 400R, 400G, and 400B. The second lens array 130 has a configuration in which the plurality of second lenslets 132 are arranged in a matrix in a plane perpendicular to the illumination optical axis AX1.

The polarization conversion element 140 is an optical element that converts the polarization directions of the sub-light fluxes divided by the first lens array 120 into an aligned polarization direction and outputs substantially one type of linearly polarized sub-light fluxes. The polarization conversion element 140 includes a polarization separation layer that directly transmits a portion of the light from the light source apparatus 102 that has one linearly polarized light component and reflects a portion of the light that has the other linearly polarized light component in a direction perpendicular to the illumination optical axis AX1, a reflection layer that reflects the other linearly polarized light component reflected off the polarization separation layer in the direction parallel to the illumination optical axis AX1, and a retardation plate that converts the other linearly polarized light component reflected off the reflection layer into the one linearly polarized light component.

The superimposing lens 150 is an optical element that collects the sub-light fluxes from the polarization conversion element 140 and superimposes the collected sub-light fluxes in the vicinity of the image formation area of each of the liquid crystal light modulators 400R, 400G, and 400B. The superimposing lens 150 is so disposed that the optical axis of the superimposing lens 150 substantially coincides with the optical axis of the light source apparatus 102. The superimposing lens 150 may be a compound lens that is a combination of a plurality of lenses. The first lens array 120, the second lens array 130, and the superimposing lens 150 form an optical integration system that makes the in-plane optical intensity distribution of the light from the light source apparatus 102 uniform.

The lens integrator system using the first lens array 120 and the second lens array 130 may be replaced with a rod integrator system using a rod lens.

The color separation/light guiding system 200 includes a dichroic mirror 210, a dichroic mirror 220, a reflection mirror 230, a reflection mirror 240, a reflection mirror 250, a relay lens 260, and a relay lens 270. The color separation/light guiding system 200 has a function of separating the light from the illuminator 110 into red light, green light, and blue light and guiding the color light fluxes, that is, the red light, the green light, and the blue light, to the liquid crystal light modulators 400R, 400G, and 400B, respectively, which are objects to be illuminated.

Each of the dichroic mirror 210 and the dichroic mirror 220 is a mirror having a wavelength selecting transmissive film formed on a substrate, the wavelength selecting transmissive film reflecting light in a predetermined wavelength region whereas transmitting light in the other wavelength region. The dichroic mirror 210, which is one of the dichroic mirror 210 and the dichroic mirror 220, reflects the red light component and transmits the green light component and the blue light component. The dichroic mirror 220 reflects the green light component and transmits the blue light component. The reflection mirror 230 reflects the red light component. The reflection mirrors 240 and 250 reflect the blue light component.

The red light reflected off the dichroic mirror 210 is reflected off the reflection mirror 230, passes through the collector lens 300R, and impinges on the image formation area of the liquid crystal light modulator 400R for red light. The green light having passed through the dichroic mirror 210 is reflected off the dichroic mirror 220, passes through the collector lens 300G, and impinges on the image formation area of the liquid crystal light modulator 400G for green light. The blue light having passed through the dichroic mirror 220 travels along the relay lens 260, the light incident-side reflection mirror 240, the relay lens 270, and light exiting-side reflection mirror 250, and the collector lens 300B, and impinges on the image formation area of the liquid crystal light modulator 400B for blue light. The relay lens 260, the relay lens 270, the reflection mirror 240, and the reflection mirror 250 function as a relay system that guides the blue light component having passed through the dichroic mirror 220 to the liquid crystal light modulator 400B.

The liquid crystal light modulator 400R, the liquid crystal light modulator 400G, and the liquid crystal light modulator 400B modulate the color light fluxes incident thereon in accordance with image information to form a color image.

The liquid crystal light modulator 400R, the liquid crystal light modulator 400G, and the liquid crystal light modulator 400B are objects to be illuminated. Although not shown, light incident-side polarizers are disposed between the collector lens 300R, the collector lens 300G, the collector lens 300B and the liquid crystal light modulator 400R, the liquid crystal light modulator 400G, and the liquid crystal light modulator 400B, respectively, and light exiting-side polarizers are disposed between the liquid crystal light modulator 400R, the liquid crystal light modulator 400G, the liquid crystal light modulator 400B and the cross dichroic prism 500, respectively. The light incident-side polarizers, the liquid crystal light modulator 400R, the liquid crystal light modulator 400G, the liquid crystal light modulator 400B, and the light exiting-side polarizers perform optical modulation on the incident color light fluxes.

Each of the liquid crystal light modulators 400R, 400G, and 400B is a transmissive liquid crystal light modulator that encapsulates and seals a liquid crystal material, which is an electro-optic substance, between a pair of transparent glass substrates. Each of the liquid crystal light modulators 400R, 400G, and 400B includes, for example, a polysilicon TFT as a switching device to modulate the polarization direction of the one type of linearly polarized light having exited out of the light incident-side polarizer in accordance with a given image signal.

The cross dichroic prism 500 is an optical element that combines optical images formed by respective modulated color light fluxes having exited out of the light exiting-side polarizers to form a color image. The cross dichroic prism 500 is formed by bonding four rectangular prisms and thus has a substantially square shape in a plan view. Dielectric multilayer films are formed on the substantially X-shaped interfaces between the bonded rectangular prisms. The dielectric multilayer film formed on one of the substantially X-shaped interfaces transmits the green light and the blue light and reflects the red light, whereas the dielectric multilayer film formed on the other interface transmits the red light and the green light and reflects the blue light. The two types of dielectric multilayer film formed on the substantially X-shaped interfaces deflect the red light and the blue light, which then travel in the same direction as the green light, so that the three color light fluxes are combined with each other.

The color image having exited out of the cross dichroic prism 500 is enlarged and projected through the projection system 600 and forms an image on a screen.

As described above, according to the projector 800 having the configuration described above, the light source apparatus 102 used in the illuminator 110 can efficiently perform light combination, whereby high-intensity light can be formed with an increase in size of the light source suppressed. The projector 800 can therefore form a high-intensity, bright image with an increase in size of the light source suppressed.

Fourth Embodiment

A light source apparatus according to a fourth embodiment will be described below. The light source apparatus according to the present embodiment is a variation, for example, of the light source apparatus 102 according to the second embodiment and differs therefrom only in that the wavelength conversion element is of light-reflective type, and no overall description will therefore be made.

Figure 6:
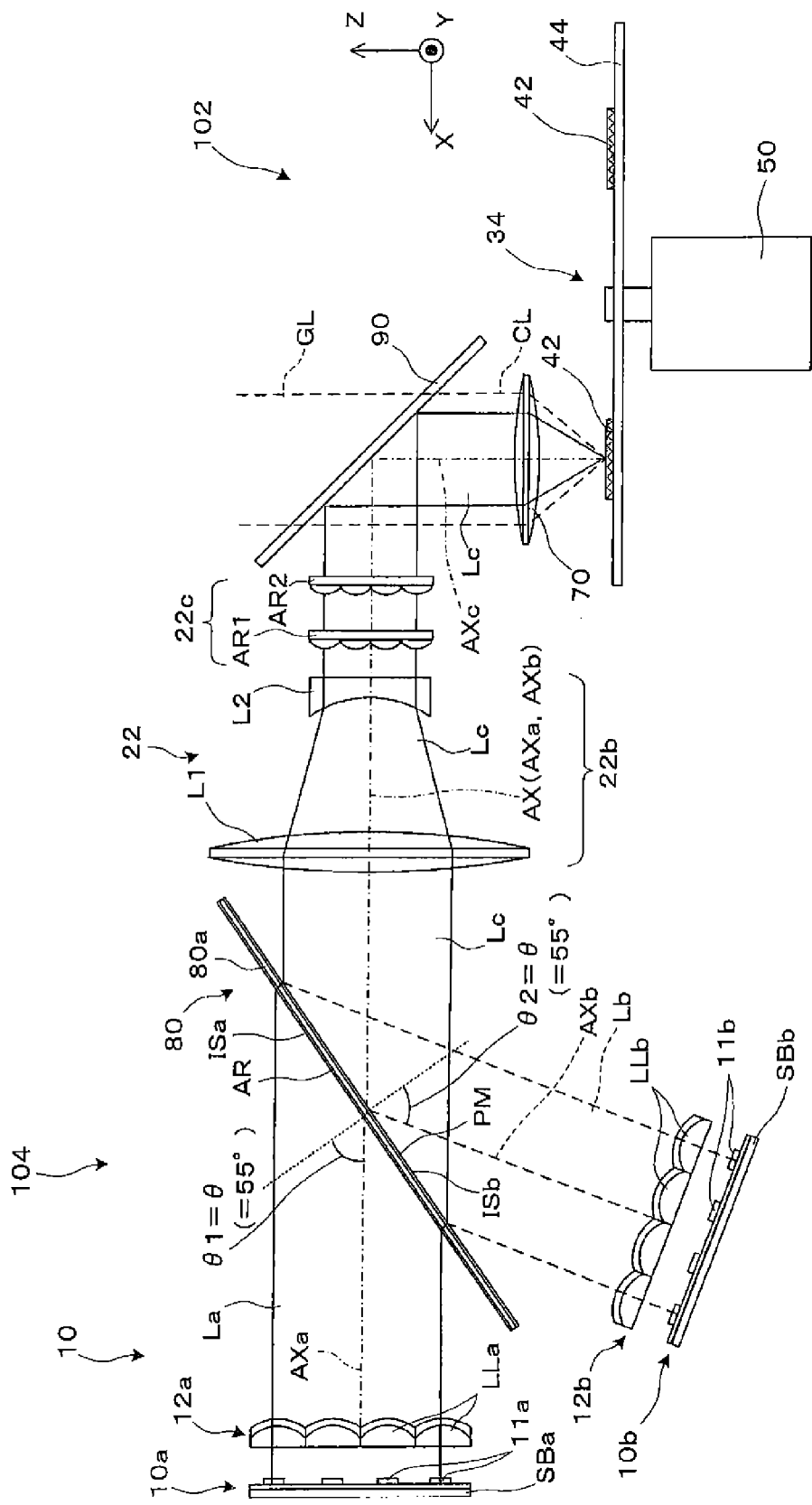
FIG. 6 describes the optical system of a light source apparatus according to a fourth embodiment.

Alight source apparatus 104 according to the present embodiment includes the light source 10, the light combiner 80, the Koehler illumination system 22 capable of making the light from the light combiner 80 uniform for illumination, a rotating fluorescent plate 34, the motor 50, a pickup lens 70, which not only is a collector system but also functions as a collimation system, and a wavelength separation element 90, and the light source 10 has the first light source unit 10a and the second light source unit 10b, as shown in FIG. 6. The Koehler illumination system 22, which includes the afocal system 22b, which adjust the beam cross section of light, and the lens array integrator 22c, which divides light incident thereon, uniformly illuminates the fluorescent material 42 in the form of Koehler illumination.

The wavelength separation element 90 is disposed in the optical path from the Koehler illumination system 22 to the rotating fluorescent plate 34 in such a way that the wavelength separation element 90 intersects not only an optical axis AX of the light source 10 and the light combiner 80 but also an optical axis AXc of the rotating fluorescent plate 34 that is perpendicular to the optical axis AX at an intersection angle of 45°. The wavelength separation element 90 reflects the combined laser light Lc, which is combined light from the light combiner 80, toward the rotating fluorescent plate 34. The wavelength separation element 90 reflects nearly all light components within a range from 430 to 450 nm, which is the wavelength range of the combined laser light Lc. That is, the wavelength separation element 90 reflects nearly all primary components of the combined laser light Lc and directs them toward the rotating fluorescent plate 34.

The pickup lens 70, which is disposed in the optical path between the rotating fluorescent plate 34 and the wavelength separation element 90, substantially collects the combined laser light Lc reflected off the wavelength separation element 90 and causes the resultant light to be incident on the fluorescent material 42. That is, the pickup lens 70 not only functions as a collector system that collects the combined laser light Lc but also functions as a collimation system that collimates mixed light CL from the fluorescent material 42, as will be described later.

The rotating fluorescent plate 34 is what is called a reflective rotating fluorescent plate. The rotating fluorescent plate 34 is formed of a plate 44 rotatable by the motor 50 and the fluorescent material 42 formed on part of the plate 44 continuously along the direction in which the plate 44 rotates.

The rotating fluorescent plate 34 in operation rotates at 7500 rpm. The fluorescent material 42, which has an annular shape and is concentric with the rotating fluorescent plate 34, is disposed on one surface of the rotating fluorescent plate 34. Although not described in detail, the rotating fluorescent plate 34 has a diameter of, for example, about 50 mm and is so configured that the optical axis of the excitation light incident on the rotating fluorescent plate 34 passes through the fluorescent material 42 in a position set apart from the center of rotation of the rotating fluorescent plate 34 by about 22.5 mm. That is, the rotating fluorescent plate 34 rotates at a speed of rotation that allows a focused spot of the excitation light to move along the fluorescent material 42 at about 18 m/sec.

The plate 44, which supports the fluorescent material 42, is made of a transparent material that transmits the excitation light, such as crystal glass, quartz, sapphire, optical glass, and transparent resin, or an opaque material that does not transmit the excitation light, such as a metal. A dichroic film formed, for example, of a dielectric multilayer film may further be provided between the fluorescent material 42 and the plate 44 so that components of the light emitted from the fluorescent material 42 that return toward the plate 44 are reflected toward the wavelength separation element 90 for improvement in light usage efficiency.

The pickup lens 70 prevents the mixed light CL emitted from the fluorescent material 42 on the rotating fluorescent plate 34 from diverging but substantially parallelizes the mixed light CL. That is, the pickup lens 70 functions as a collimation system that parallelizes the mixed light CL, which is the light from the rotating fluorescent plate 34.

It is noted that the wavelength separation element 90 removes part of the components of the mixed light CL having passed through the pickup lens 70 and outputs the remaining light as light source light GL. That is, among the light components having exited out of the fluorescent material 42, the wavelength separation element 90 reflects light in the wavelength band of the blue light. As a result, yellow light containing green light and red light is outputted as the light source light GL.

Although not shown or otherwise described, for example, the light source light GL from the light source apparatus 104 and blue laser light from another light source can be combined with each other to form white light from which a color image can be formed.

In the present embodiment, causing the laser light La, which is the first light, to be incident on the light combiner 80 at an angle greater than 45° and pass through the light combiner 80 and the laser light Lb, which is the second light, to be incident on the light combiner 80 at an angle greater than 45° and reflected off the light combiner 80 also allows the light combination to be efficiently performed, whereby high-intensity light can be formed with an increase in size of the light source suppressed.

Others

The invention has been described with reference to the above embodiments. The invention is, however, not limited to the embodiments described above and can be implemented in a variety of other aspects to the extent that they do not depart from the substance of the invention. For example, the following variations are conceivable.

In the above description, the fluorescent material 42 is formed on the plate 40 rotated by the motor 50, and heat generated in the fluorescent material 42 when it is irradiated with the excitation light dissipates in a wide area along the direction in which the plate 40 rotates, whereby the heat generated in the fluorescent material 42 does not greatly reduce the light emission efficiency. When no decrease in light emission efficiency will occur, the fluorescent material 42 may be disposed with no rotating mechanism provided.

Further, the plate 40 is, for example, a circular plate in FIG. 1B but is not limited to a circular plate.

The above description has been made with reference to the case where the fluorescent material formed on the rotating fluorescent plate emits red light and green light when excited by blue excitation light, but the fluorescent material is not limited thereto. For example, violet or ultraviolet light may be used as the excitation light, and a fluorescent material that is excited by the excitation light may emit three color light fluxes, red light, green light, and blue light.

The fluorescent material has been described with reference to the case where one type of fluorescent material is continuously formed along the direction in which the plate rotates, but the configuration of the fluorescent material is not limited thereto. As in the case of the rotating fluorescent plate described in JP-A-2011-158502, a plurality of fluorescent materials may be formed along the direction in which the plate rotates and allowed to sequentially emit a plurality of color light fluxes. The plurality of color light fluxes sequentially emitted from the rotating fluorescent plate are modulated by a single light modulator to form a color image.

Further, in the above description, the fluorescent material 42, which produces fluorescence, is an object to be irradiated with the combined laser light Lc, which is combined light. The object is however not limited to a fluorescent material but may, for example, be a diffuser plate that diffuses light.

Further, in the above description, a laser light source that emits laser light is used as each of the first light source unit 10a and the second light source unit 10b, but the light source may alternatively be another type of solid-state light source or even a xenon or mercury lamp. For example, when a xenon lamp, which emits non-polarized light, is used as the first light source unit 10a, the first light source unit 10a further includes a polarization conversion element that converts the light emitted from the first light source unit 10a into P-polarized light. Further, when a xenon lamp, which emits non-polarized light, is used as the second light source unit 10b, the second light source unit 10*b* further includes a polarization conversion element that converts the light emitted from the second light source unit 10*b* into S-polarized light. The configuration allows the light emitted from the first light source unit 10*a* and the light emitted from the second light source unit 10*b* to be efficiently combined with each other.

The entire disclosure of Japanese Patent Application No. 2012-168080, filed on Jul. 30, 2012 is expressly incorporated by reference herein.

What is claimed is:

1. A light source apparatus comprising:
a first light source unit that emits first light;
a second light source unit that emits second light; and
a light combiner that combines the first light emitted from the first light source unit and the second light emitted from the second light source unit and outputs the combined light,
wherein the light combiner has a polarization separation film that transmits light polarized in a first direction and reflects light polarized in a second direction perpendicular to the first direction,
the first light is polarized in the first direction,
the second light is polarized in the second direction,
an angle of incidence $\theta 1$ of the first light with respect to the polarization separation film and an angle of incidence $\theta 2$ of the second light with respect to the polarization separation film are each greater than 45°,
an optical axis of the first light source unit and an optical axis of the second light source unit form an angle smaller than 90°, and
wherein expressions (1), (2), and (3) are satisfied as follows:

$$45° < \alpha \quad (1)$$

$$\beta \leq \theta 1 \leq 2\alpha - \beta \quad (2)$$

$$\beta \leq \theta 2 \leq 2\alpha - \beta \quad (3)$$

where $\alpha$ represents a maximum efficiency angle that is an angle of incidence with respect to the polarization separation film where polarized light combination efficiency is maximized, the maximum efficiency angle $\alpha$ determined in accordance with a wavelength band of the first light and a wavelength band of the second light, and $\beta$ is $(45°+\alpha)/2$.

2. The light source apparatus according to claim 1,
wherein the angle of incidence $\theta 1$ of the first light with respect to the polarization separation film and the angle of incidence $\theta 2$ of the second light with respect to the polarization separation film are equal to each other.

3. The light source apparatus according to claim 1,
wherein in a wavelength band of the first light, the angle of incidence $\theta 1$ of the first light is so set that the polarization separation film transmits the first light at a transmittance of a predetermined value or greater and the light combiner reflects the first light at a reflectance of a predetermined value or smaller, and
in a wavelength band of the second light, the angle of incidence $\theta 2$ of the second light is so set that the polarization separation film reflects the second light at a reflectance of a predetermined value or greater.

4. The light source apparatus according to claim 1,
wherein the light combiner further includes a base that supports the polarization separation film, and
the angle of incidence $\theta 1$ of the first light falls within a range including Brewster's angle with respect to the base.

5. The light source apparatus according to claim 1, further comprising:
a collector system that collects the combined light outputted from the light combiner; and
an object to be irradiated with the combined light collected by the collector system.

6. The light source apparatus according to claim 1, further comprising:
an afocal system that adjusts a beam cross section of the combined light outputted from the light combiner;
a lens array integrator that is disposed in a position downstream of the afocal system, divides light incident on the lens array integrator, and outputs the divided light fluxes in such a way that the light fluxes are superimposed in a predetermined position; and
an object that is disposed in the predetermined position and irradiated with light outputted from the lens array integrator.

7. The light source apparatus according to claim 5,
wherein the object is at least one of a diffuser plate that diffuses light and a fluorescent material that produces fluorescence.

8. The light source apparatus according to claim 5, further comprising a rotating plate that rotatably holds the object.

9. A projector comprising:
the light source apparatus according to claim 1;
a light modulator that modulates the light from the light source apparatus in accordance with image information; and
a projection system that projects the modulated light from the light modulator to form an image.

10. A projector comprising:
the light source apparatus according to claim 2;
a light modulator that modulates the light from the light source apparatus in accordance with image information; and
a projection system that projects the modulated light from the light modulator to form an image.

11. A projector comprising:
the light source apparatus according to claim 3;
a light modulator that modulates the light from the light source apparatus in accordance with image information; and
a projection system that projects the modulated light from the light modulator to form an image.

12. A projector comprising:
the light source apparatus according to claim 4;
a light modulator that modulates the light from the light source apparatus in accordance with image information; and
a projection system that projects the modulated light from the light modulator to form an image.

13. A projector comprising:
the light source apparatus according to claim 5;
a light modulator that modulates the light from the light source apparatus in accordance with image information; and
a projection system that projects the modulated light from the light modulator to form an image.

14. A projector comprising:
the light source apparatus according to claim 6;
a light modulator that modulates the light from the light source apparatus in accordance with image information; and
a projection system that projects the modulated light from the light modulator to form an image.

15. A projector comprising:

the light source apparatus according to claim 7;

a light modulator that modulates the light from the light source apparatus in accordance with image information; and a projection system that projects the modulated light from the light modulator to form an image.

16. A projector comprising:

the light source apparatus according to claim 8;

a light modulator that modulates the light from the light source apparatus in accordance with image information; and a projection system that projects the modulated light from the light modulator to form an image.

* * * * *